United States Patent
Huang et al.

(10) Patent No.: US 11,042,584 B2
(45) Date of Patent: Jun. 22, 2021

(54) SYSTEMS AND METHODS FOR RANDOM ACCESS OF SLIDE CONTENT IN RECORDED WEBINAR PRESENTATIONS

(71) Applicant: CyberLink Corp., Shindian (TW)

(72) Inventors: Jau-Hsiung Huang, New Taipei (TW); Ting-Wei (Jenny) Chu, Taipei (TW)

(73) Assignee: CYBERLINK CORP., Taipei (TW)

( * ) Notice: Subject to any disclaimer, the term of this patent is extended or adjusted under 35 U.S.C. 154(b) by 328 days.

(21) Appl. No.: 16/018,331

(22) Filed: Jun. 26, 2018

(65) Prior Publication Data
US 2019/0034434 A1    Jan. 31, 2019

Related U.S. Application Data

(60) Provisional application No. 62/537,023, filed on Jul. 26, 2017.

(51) Int. Cl.
*G06F 17/30* (2006.01)
*G06F 16/438* (2019.01)
(Continued)

(52) U.S. Cl.
CPC ...... *G06F 16/4393* (2019.01); *G06F 3/04842* (2013.01); *G06F 16/907* (2019.01); *H04L 12/1831* (2013.01)

(58) Field of Classification Search
CPC ............... G06F 16/4393; G06F 16/907; G06F 3/04842; H04L 12/1831
See application file for complete search history.

(56) References Cited

U.S. PATENT DOCUMENTS 7,624,416 B1    11/2009    Vandermolen et al.
7,735,101 B2    6/2010     Lanza et al.
(Continued)

FOREIGN PATENT DOCUMENTS

EP    2435931 A1    4/2012

OTHER PUBLICATIONS

Yuja, "Search Inside Video" (printed Jun. 29, 2018).
(Continued)

*Primary Examiner* — Huawen A Peng
(74) *Attorney, Agent, or Firm* — McClure, Qualey & Rodack, LLP

(57) ABSTRACT

A server computing device receives user input from a presenter to initiate a live webinar presentation comprising a plurality of slides. Responsive to receiving the user input to initiate the live webinar presentation, the server computing device monitors slide transitions triggered by the presenter and logs time stamp data for each slide transition, generates attendee participation data, and stores the live webinar presentation as a webinar presentation video, the time stamp data, and the attendee participation data. The server computing device obtains a request from a client device to view the stored webinar presentation video and partitions the webinar presentation video into slides based on the time stamp data. The server computing device causes a user interface to be displayed at the client device, the user interface displaying, for each slide, thumbnail graphical representations of each slide for playback of the stored webinar presentation based on a thumbnail graphical representation selected by the user.

17 Claims, 18 Drawing Sheets

(51) Int. Cl.
*G06F 3/0484* (2013.01)
*H04L 12/18* (2006.01)
*G06F 16/907* (2019.01)

(56) References Cited

U.S. PATENT DOCUMENTS

| | | |
|---|---|---|
| 8,296,811 B1 | 10/2012 | Begeja et al. |
| 8,713,618 B1 | 4/2014 | Kuznetsov |
| 8,972,262 B1 | 3/2015 | Buryak |
| 2013/0238520 A1* | 9/2013 | Hall .................... G06Q 50/205 |
| | | 705/327 |
| 2014/0123014 A1 | 5/2014 | Keen |
| 2014/0282089 A1* | 9/2014 | West .................... G06F 16/683 |
| | | 715/753 |
| 2016/0379324 A1* | 12/2016 | Hantman ............. G06Q 20/127 |
| | | 705/26.81 |
| 2017/0062013 A1 | 3/2017 | Carter et al. |
| 2017/0279860 A1* | 9/2017 | Agarwal ................ H04L 65/80 |

OTHER PUBLICATIONS

Adcock, John et al. "Talkminer: a Lecture Video Search Engine" (printed Jun. 29, 2018).
Fuji Xerox, "Search for Scenes in Lecture Videos" (printed Jun. 29, 2018).
Panopto, "Search Inside Your Videos" (printed Jun. 29, 2018).
Cisco, "Administration Guide for Cisco Media Experience Engine 3500 Release 3.3" Jan. 11, 2016.

\* cited by examiner

SYSTEMS AND METHODS FOR RANDOM ACCESS OF SLIDE CONTENT IN RECORDED WEBINAR PRESENTATIONS

CROSS-REFERENCE TO RELATED APPLICATION

This application claims priority to, and the benefit of, U.S. Provisional Patent Application entitled, "System and method for retrieving and analyzing rich medias," having Ser. No. 62/537,023, filed on Jul. 26, 2017, which is incorporated by reference in its entirety.

TECHNICAL FIELD

The present disclosure generally relates to multimedia content and more particularly, to systems and methods for providing random access of slide content in the context of recorded webinar presentations.

BACKGROUND

Webinars or live web-based seminars allow presenters to present information in real time, where presenters may include multimedia content to further enhance the presentation. In some cases, webinar attendees may later wish to access archived webinars. However, with conventional live video streaming platforms, users are typically limited to searching the webinar content from the beginning. Therefore, there is a need for an improved mechanism for efficiently accessing content in recorded webinar presentations.

SUMMARY

In accordance with one embodiment, a server computing device receives user input from a presenter to initiate a live webinar presentation comprising a plurality of slides. Responsive to receiving the user input to initiate the live webinar presentation, the server computing device monitors slide transitions triggered by the presenter and logs time stamp data for each slide transition, generates attendee participation data, and stores the live webinar presentation as a webinar presentation video, the time stamp data, and the attendee participation data. The server computing device obtains a request from a client device to view the stored webinar presentation video and partitions the webinar presentation video into slides based on the time stamp data. The server computing device causes a user interface to be displayed at the client device, the user interface displaying, for each slide, thumbnail graphical representations of each slide for playback of the stored webinar presentation based on a thumbnail graphical representation selected by the user.

Another embodiment is a system that comprises a memory storing instructions and a processor coupled to the memory. The processor is configured by the instructions to receive user input from a presenter to initiate a live webinar presentation comprising a plurality of slides. Responsive to receiving the user input to initiate the live webinar presentation, the processor monitors slide transitions triggered by the presenter and logs time stamp data for each slide transition, generates attendee participation data, and stores the live webinar presentation as a webinar presentation video, the time stamp data, and the attendee participation data. The processor obtains a request from a client device to view the stored webinar presentation video and partitions the webinar presentation video into slides based on the time stamp data. The processor causes a user interface to be displayed at the client device, the user interface displaying, for each slide, thumbnail graphical representations of each slide for playback of the stored webinar presentation based on a thumbnail graphical representation selected by the user.

Another embodiment is a non-transitory computer-readable storage medium storing instructions to be implemented by a computing device having a processor, wherein the instructions, when executed by the processor, cause the computing device to receive user input from a presenter to initiate a live webinar presentation comprising a plurality of slides. Responsive to receiving the user input to initiate the live webinar presentation, the processor monitors slide transitions triggered by the presenter and logs time stamp data for each slide transition, generates attendee participation data, and stores the live webinar presentation as a webinar presentation video, the time stamp data, and the attendee participation data. The processor obtains a request from a client device to view the stored webinar presentation video and partitions the webinar presentation video into slides based on the time stamp data. The processor causes a user interface to be displayed at the client device, the user interface displaying, for each slide, thumbnail graphical representations of each slide for playback of the stored webinar presentation based on a thumbnail graphical representation selected by the user.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

BRIEF DESCRIPTION OF THE DRAWINGS

Various aspects of the disclosure can be better understood with reference to the following drawings. The components in the drawings are not necessarily to scale, with emphasis instead being placed upon clearly illustrating the principles of the present disclosure. Moreover, in the drawings, like reference numerals designate corresponding parts throughout the several views.

DETAILED DESCRIPTION

Webinars are live web-based video conferences whereby attendees at remote locations hear and view presentations. Many times, presenters incorporate multimedia content (e.g., audio/video content, graphics, animation) to further enhance their presentations. Furthermore, the interactive nature of webinars allows attendees to ask questions and chat with the host. In some cases, past attendees may wish to view an archived webinar presentation by accessing a recorded video of the webinar presentation. There is a need for an improved mechanism for efficiently accessing content in recorded webinar presentations. Various embodiments are disclosed for allowing users to retrieve a recorded webinar presentation video and for allowing users to efficiently search and access the content of slides and corresponding multimedia. Specifically, the present invention allows users to efficiently navigate and search multimedia content of interest found in slides of a recorded webinar presentation video without having to view the webinar presentation video from the beginning.

Figure 1:
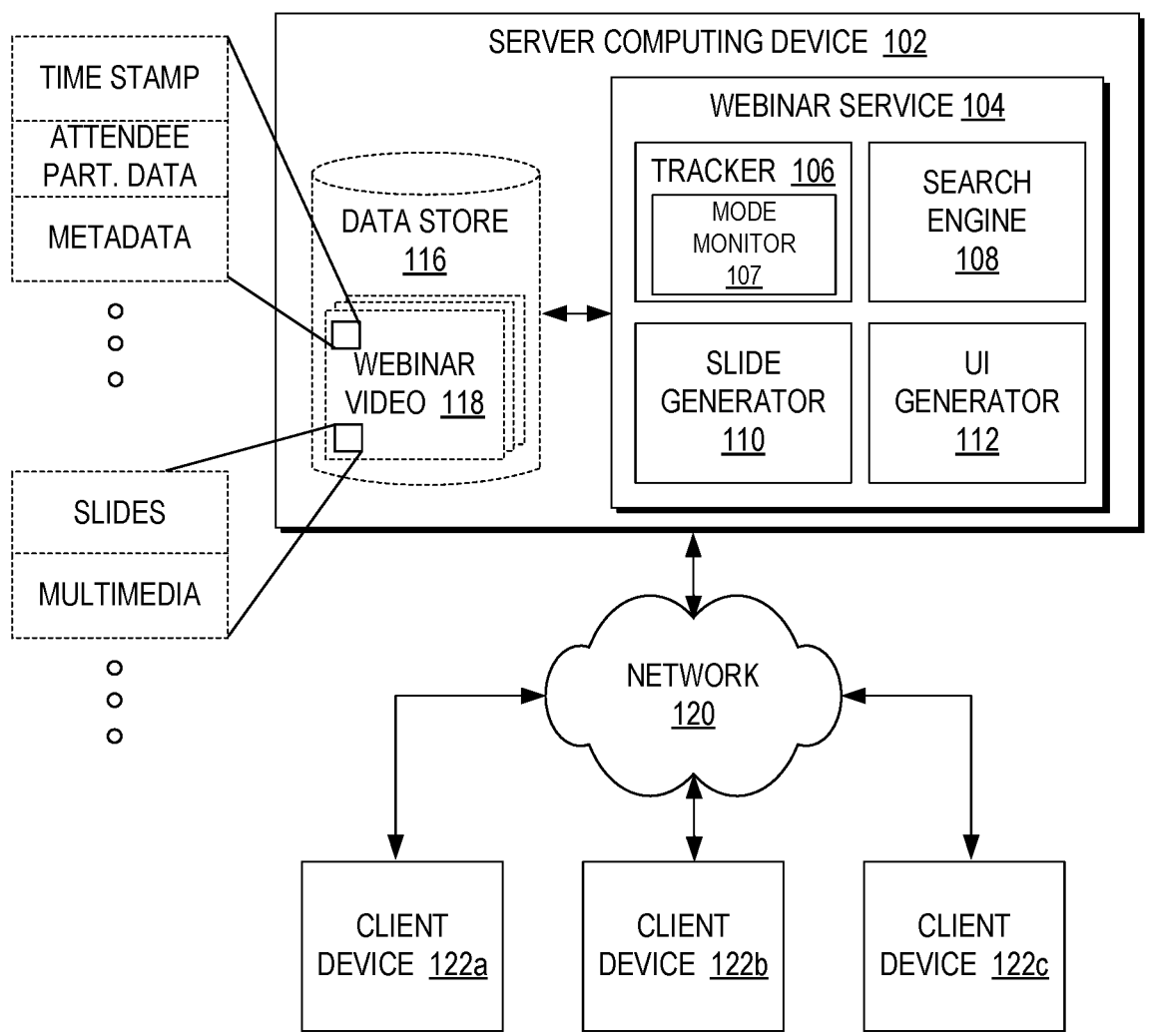
FIG. 1 is a block diagram of a server computing device for providing random access of multimedia content in recorded webinar presentations in accordance with various embodiments of the present disclosure.

A description of a system for accessing multimedia content in recorded webinar presentations is now described followed by a discussion of the operation of the components within the system. FIG. 1 is a block diagram of a server computing device 102 in which the techniques for providing random access of multimedia content in recorded webinar presentations disclosed herein may be implemented. The server computing device 102 may comprise a server computer or any other system providing computing capability. Alternatively, the server computing device 102 may employ a plurality of computing devices that can be arranged, for example, in one or more server banks, computer banks or other arrangements. Such computing devices can be located in a single installation or can be distributed among different geographical locations.

A webinar service 104 executes on a processor of the server computing device 102 and allows presenters to host live webinar presentations. The webinar service 104 also allows attendees to participate in live webinars as well as to play back recorded videos of past webinar presentations. The server computing device 102 is coupled to a network 120 such as, for example, the Internet, intranets, extranets, wide area networks (WANs), local area networks (LANs), wired networks, wireless networks, or other suitable networks, etc., or any combination of two or more such networks. Through the network, client devices 122a, 122b, 122c may be communicatively coupled to the server computing device 102 for accessing both live webinar presentations as well as archived webinar presentations recorded as webinar presentation videos.

The webinar service 104 includes a tracker 106, a search engine 108, a slide generator 110, and an UI generator 112. The tracker 106 is configured to monitor events associated with live webinar presentations. For some embodiments, the tracker 106 receives user input from a presenter to initiate a live webinar presentation comprising a plurality of slides. In response to receiving the user input to initiate the live webinar presentation, the tracker 106 then performs various tracking operations. The operations performed by the tracker 106 may include monitoring slide transitions triggered by the presenter. Specifically, when the presenter transitions between slides, the tracker 106 logs time stamp data for each slide transition. This allows the webinar service 104 to later extract slides from the recorded webinar presentation video, as described below.

The tracker 106 also generates attendee participation data. For example, the tracker 106 may monitor and log the number of attendees that interact with the presenter for each slide. Such interaction may comprise attendees sending questions to the presenter via a chat feature. The interaction may also comprise attendees providing a rating for particular slides. For example, the tracker 106 may monitor and log the number of "likes" generated by attendees for a particular slide. The tracker 106 also generates metadata relating to the content in each slide. The metadata may comprise, for example, textual information contained in each slide (e.g., slide title, slide number, annotation, video), descriptive information relating to audio/video content in each slide, the number of "likes" generated for each slide, chat exchanges produced by attendees for each slide, and so on. The tracker 106 stores the live webinar presentation as a webinar presentation video into a data store 116. The tracker 106 also stores the time stamp data, the attendee participation data, and the metadata into the data store 116.

For some embodiments, the tracker 106 includes a mode monitor 107 configured to monitor activities by a user of a client device 122 (i.e., an attendee) during a live webinar presentation. Indices corresponding to different portions of the webinar being recorded are generated based on activities by the user. In this regard, indices are generated during live streaming of the live webinar presentation. For some embodiments, such indices may comprise time stamps when mode transitions occur while the webinar is streaming. These indices or time stamps are later utilized to access the archived version of the webinar. In accordance with some embodiments, a user of a client device 122 attending a live webinar presentation may utilize various settings relating to viewing of the webinar presentation.

The settings utilized by the user while attending a live webinar may be associated with different modes of operations. For example, a first mode of operation may include a setting that allows the user to view slides of the webinar in a "slide only" mode, a setting that displays the webinar in a picture-in-picture (PIP) mode with respect to a webcam video of the presenter, or a setting that presents the webinar in an aligned mode where multiple slides are shown and aligned in a horizontal orientation or in a vertical orientation. A second mode of operation may include a setting that allows the user to only view live video of the webinar presenter captured by a webcam.

A third mode of operation may include a setting that allows the user to minimize a window displaying the webinar such that the present desktop is shown. A fourth mode of operation may include a setting that allows the user to initiate a whiteboard application, whereby the user can make annotations while participating in the webinar. A fifth mode of operation may include a setting that allows the user to display a status of the user. For example, the user may wish to post a notification to the webinar presenter and to the other attendees that the user has momentarily stepped away and will shortly rejoin the webinar. The mode monitor 107 in the tracker 106 monitors for transitions between the various modes discussed above. Based on these mode transitions, various indices of the webinar are generated where each index corresponds to a portion of the webinar.

A past attendee of a webinar presentation may later wish to view the same webinar presentation again. Alternatively, an individual may wish to view a different webinar presentation that the individual did not attend. The attendee generates a request via one of the client devices 122a, 122b, 122c and transmits the request to the server computing device 102. The search engine 108 in the server computing device 102 receives the request from a client device 122 to view an archived webinar presentation video in the data store 116. As one of ordinary skill will appreciate, the archived webinar presentation video may be encoded in any of a number of formats including, but not limited to, Motion Picture Experts Group (MPEG)-1, MPEG-2, MPEG-4, H.264, Third Generation Partnership Project (3GPP), 3GPP-2, Standard-Definition Video (SD-Video), High-Definition Video (HD-Video), Digital Versatile Disc (DVD) multimedia, Video Compact Disc (VCD) multimedia, High-Definition Digital Versatile Disc (HD-DVD) multimedia, Digital Television Video/High-definition Digital Television (DTV/HDTV) multimedia, Audio Video Interleave (AVI), Digital Video (DV), QuickTime (QT) file, Windows Media Video (WMV), Advanced System Format (ASF), Real Media (RM), Flash Media (FLV), an MPEG Audio Layer III (MP3), an MPEG Audio Layer II (MP2), Waveform Audio Format (WAV), Windows Media Audio (WMA), or any number of other digital formats.

The slide generator 110 is configured to partition the webinar presentation video into slides based on time stamp data captured earlier by the tracker 106 during live presentation of the webinar presentation. In some embodiments, the slide generator 110 may partition the webinar presentation video into segments corresponding to the various slides. For example, a first video segment that spans the first 3 minutes of the webinar presentation video may correspond to the first slide in the webinar presentation, while a second video segment that spans the next 5 minutes of the webinar presentation video may correspond to the second slide in the webinar presentation.

Referring back to the mode monitor 107, for some embodiments, the mode monitor 107 outputs a trigger signal in response to detecting a mode transition. In response to receiving the trigger signal, the slide generator 110 takes images and/or video of the current portion of the live webinar being streamed. That is, for some embodiments, the tracker 106 may be utilized during a live webinar to cause the slide generator 110 to capture and index portions of the webinar for later access. For some embodiments, the slide generator 110 may record a segment of the webinar based on the trigger signal as a video, where the video corresponds to a portion within the webinar.

The UI generator 112 is configured to cause a user interface to be displayed at the client device 122, where the user interface displays, for each slide, thumbnail graphical representations of each slide. In some embodiments, thumbnail graphical representations for multimedia content contained in each slide. The UI generator 112 is further configured to obtain one or more keywords from the client device 122.

The search engine 108 generates a grouping comprising one or more candidate slides in the webinar presentation based on the at least one keyword, the time stamp data, and the attendee participation data. The grouping of candidate slides represents slides that are most likely of interest of the viewer. Thumbnail graphical representations of these candidate slides are presented to the user to select from. The UI generator 112 obtains a selection of one or more slides in the grouping comprising at least one candidate slides and provides access to the selected slide(s).

Figure 2:
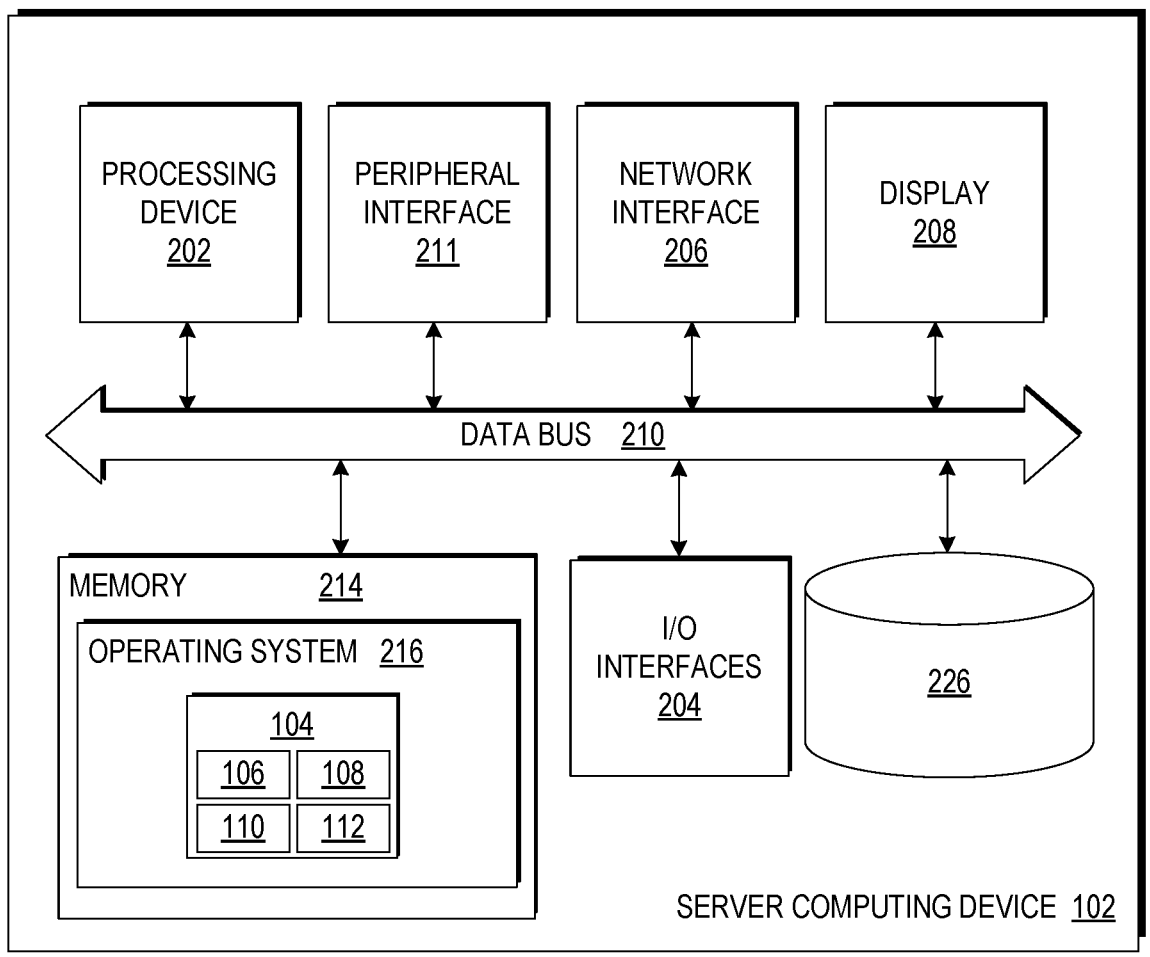
FIG. 2 is a schematic diagram of the server computing device of FIG. 1 for providing random access of multimedia content in recorded webinar presentations in accordance with various embodiments of the present disclosure.

FIG. 2 illustrates a schematic block diagram of the server computing device 102 in FIG. 1. The server computing device 102 may be embodied in any one of a wide variety of wired and/or wireless computing devices, such as a server computer or any other system providing computing capability. As discussed above, the server computing device 102 may employ a plurality of computing devices that can be arranged, for example, in one or more server banks, computer banks or other arrangements. Such computing devices can be located in a single installation or can be distributed among different geographical locations.

As shown in FIG. 2, the server computing device 102 comprises memory 214, a processing device 202, a number of input/output interfaces 204, a network interface 206, a display 208, a peripheral interface 211, and mass storage 226, wherein each of these components are connected across a local data bus 210. The processing device 202 may include any custom made or commercially available processor, a central processing unit (CPU) or an auxiliary processor among several processors associated with the server computing device 102, a semiconductor based microprocessor (in the form of a microchip), a macroprocessor, one or more application specific integrated circuits (ASICs), a plurality of suitably configured digital logic gates, and other well known electrical configurations comprising discrete elements both individually and in various combinations to coordinate the overall operation of the computing system.

The memory 214 may include any one of a combination of volatile memory elements (e.g., random-access memory (RAM, such as DRAM, and SRAM, etc.)) and nonvolatile memory elements (e.g., ROM, hard drive, tape, CDROM, etc.). The memory 214 typically comprises a native operating system 216, one or more native applications, emulation systems, or emulated applications for any of a variety of operating systems and/or emulated hardware platforms, emulated operating systems, etc. For example, the applications may include application specific software which may comprise some or all the components of the server computing device 102 depicted in FIG. 1. In accordance with such embodiments, the components are stored in memory 214 and executed by the processing device 202, thereby causing the processing device 202 to perform the operations/functions disclosed herein. One of ordinary skill in the art will appreciate that the memory 214 can, and typically will, comprise other components which have been omitted for purposes of brevity. For some embodiments, the components in the server computing device 102 may be implemented by hardware and/or software.

Input/output interfaces 204 provide any number of interfaces for the input and output of data. For example, where the server computing device 102 comprises a personal computer, these components may interface with one or more user input/output interfaces 204, which may comprise a keyboard or a mouse, as shown in FIG. 2. The display 208 may comprise a computer monitor, a plasma screen for a PC, a liquid crystal display (LCD) on a hand held device, a touchscreen, or other display device.

In the context of this disclosure, a non-transitory computer-readable medium stores programs for use by or in connection with an instruction execution system, apparatus, or device. More specific examples of a computer-readable medium may include by way of example and without limitation: a portable computer diskette, a random access memory (RAM), a read-only memory (ROM), an erasable programmable read-only memory (EPROM, EEPROM, or Flash memory), and a portable compact disc read-only memory (CDROM) (optical).

Figure 3:
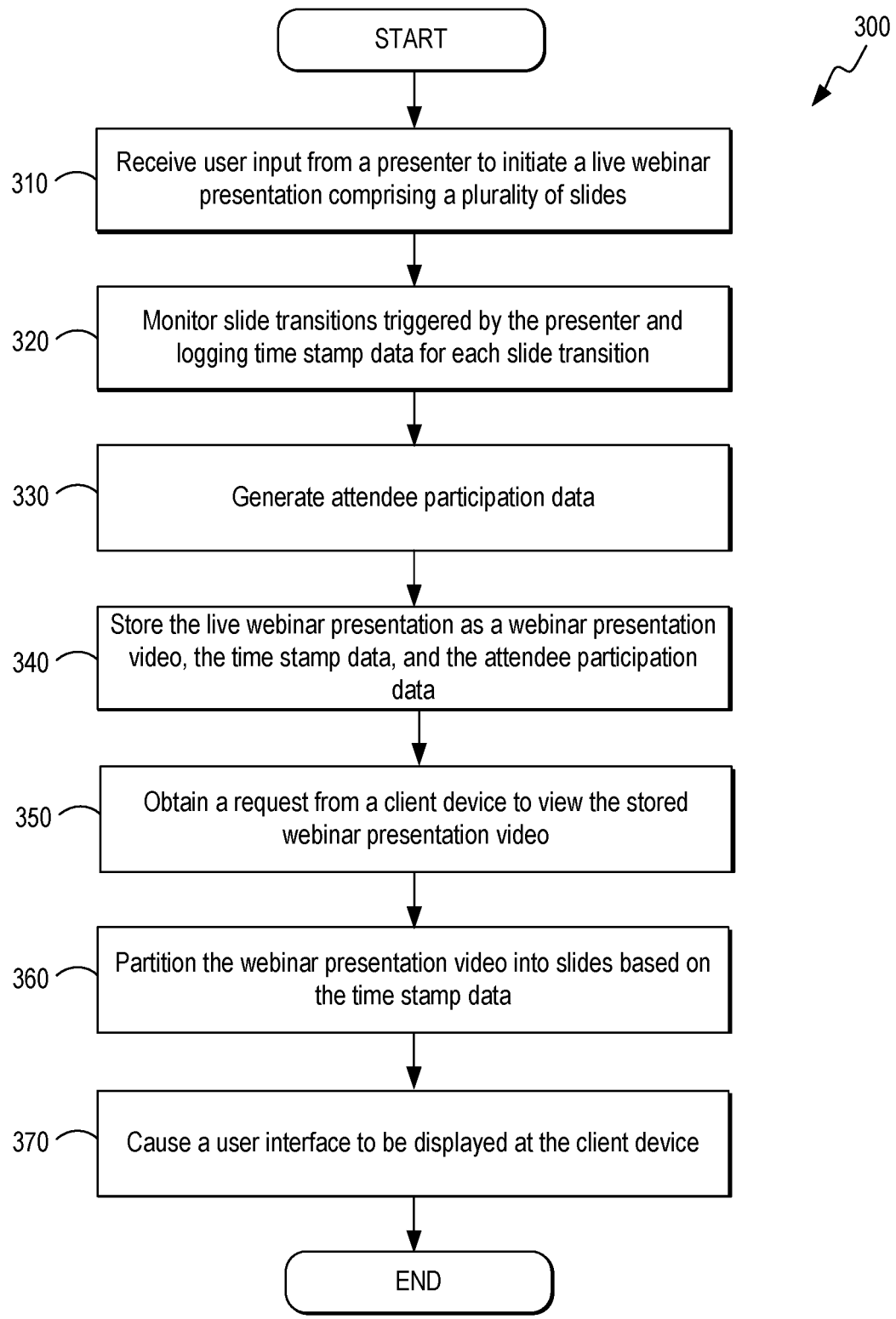
FIG. 3 is a top-level flowchart illustrating examples of functionality implemented as portions of the computing device of FIG. 1 for providing random access of multimedia content in recorded webinar presentations according to various embodiments of the present disclosure.

Reference is made to FIG. 3, which is a flowchart 300 in accordance with various embodiments for providing random access of multimedia content in recorded webinar presentations performed by the server computing device 102 of FIG. 1. It is understood that the flowchart 300 of FIG. 3 provides merely an example of the different types of functional arrangements that may be employed to implement the operation of the various components of the server computing device 102. As an alternative, the flowchart 300 of FIG. 3 may be viewed as depicting an example of steps of a method implemented in the server computing device 102 according to one or more embodiments.

Although the flowchart 300 of FIG. 3 shows a specific order of execution, it is understood that the order of execution may differ from that which is depicted. For example, the order of execution of two or more blocks may be scrambled relative to the order shown. Also, two or more blocks shown in succession in FIG. 3 may be executed concurrently or with partial concurrence. It is understood that all such variations are within the scope of the present disclosure.

At block 310, the server computing device 102 receives user input from a presenter to initiate a live webinar presentation comprising a plurality of slides. For some embodiments, the user input comprises a voice command directing the server computing device 102 to locate a slide in the live webinar presentation. In block 320, the server computing device 102 monitors slide transitions triggered by the presenter and logging time stamp data for each slide transition.

In block 330, the server computing device 102 generates attendee participation data. For some embodiments, generating the attendee participation data may comprise tracking a number of attendees viewing each slide in the webinar presentation, tracking chat content generated by attendees for each slide in the webinar presentation, and/or tracking a list of attendees. For some embodiments, tracking the chat content generated by the attendees for each slide in the webinar presentation may comprise identifying words with a threshold occurrence rate in the chat content and storing the identified words.

In block 340, the server computing device 102 stores the live webinar presentation as a webinar presentation video, the time stamp data, and the attendee participation data. For some embodiments, a slide title, slide numbering, annotation, and/or animation is also stored with the webinar presentation video. In block 350, the server computing device 102, obtains a request from a client device 122 (FIG. 1) to view the stored webinar presentation video. In block 360, the server computing device 102 partitions the webinar presentation video into slides based on the time stamp data.

In block 370, the server computing device 102 causes a user interface to be displayed at the client device 122, where the user interface displays, for each slide, thumbnail graphical representations of each slide for playback of the stored webinar presentation based on a thumbnail graphical representation selected by the user. For some embodiments, playback of the stored webinar presentation is further based on attendee participation data selected by the user. For some embodiments, the server computing device 102 may be further configured to obtain at least one keyword from the client device. The server computing device 102 generates and displays a grouping comprising at least one candidate slide in the webinar presentation based on the at least one keyword, the time stamp data, and the attendee participation data.

The server computing device 102 may be further configured to obtain a selection of a slide in the grouping comprising at least one candidate slide and perform playback of a portion of the webinar presentation video corresponding to the selected slide. The grouping comprising at least one candidate slide in the webinar presentation may be generated based on the attendee participation data by including slides with a highest occurrence of words in the grouping comprising the at least one candidate slide. The grouping comprising at least one candidate slide in the webinar presentation may be generated based on the time stamp by analyzing the time stamp data for each slide and including slides viewed for at least a threshold time interval in the grouping comprising the at least one candidate slide. For example, slides viewed for at least 20 seconds may be included in the grouping.

For some embodiments, the server computing device 102 is further configured to obtain user input indicating viewer approval of slides and track slides corresponding to the user input as viewer approved slides. For such embodiments, the grouping comprising at least one candidate slide in the webinar presentation is generated based on viewer approved slides having a threshold level of viewer approval.

For some embodiments, the server computing device 102 may be further configured to obtain a voice command from the client device and perform speech-to-text conversion on the voice command to obtain at least one keyword. For such embodiments, the server computing device 102 is further configured to generate a grouping comprising at least one candidate slide in the webinar presentation based on the at least one keyword, the time stamp data, and the attendee participation data. The server computing device 102 is further configured to obtain a selection of a slide in the grouping comprising at least one candidate slide and perform playback of a portion of the webinar presentation video corresponding to the selected slide. Thereafter, the process in FIG. 3 ends.

Figure 4:
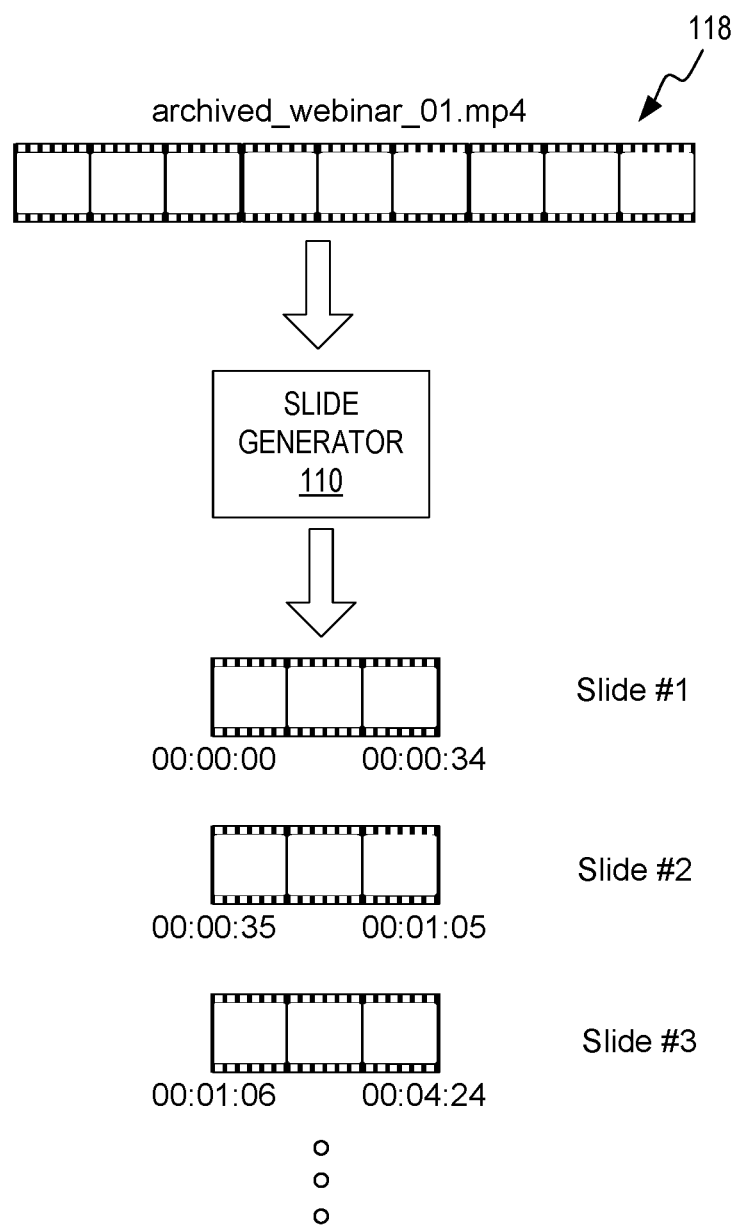
FIG. 4 illustrates partitioning of a webinar presentation video into slides based on time stamp data according to various embodiments of the present disclosure.

Having described the basic framework of a system for providing random access of multimedia content in recorded webinar presentations, reference is made to the following figures, which illustrate various features according to various embodiments. FIG. 4 illustrates partitioning of a webinar presentation video into slides based on the time stamp data according to various embodiments of the present disclosure. For some embodiments, the search engine 108 in the server computing device 102 (FIG. 1) obtains a request from a user at a client device 122 (FIG. 1) to access an archived webinar presentation video 118. In response, the slide generator 110 in the server computing device 102 retrieves the requested webinar presentation video 118 from the data store 116. Based on the time stamp data logged by the tracker 106 during live presentation of the requested webinar presentation video 118, the slide generator 110 partitions the webinar presentation video 118 into the slides that make up the webinar presentation.

Figure 5:
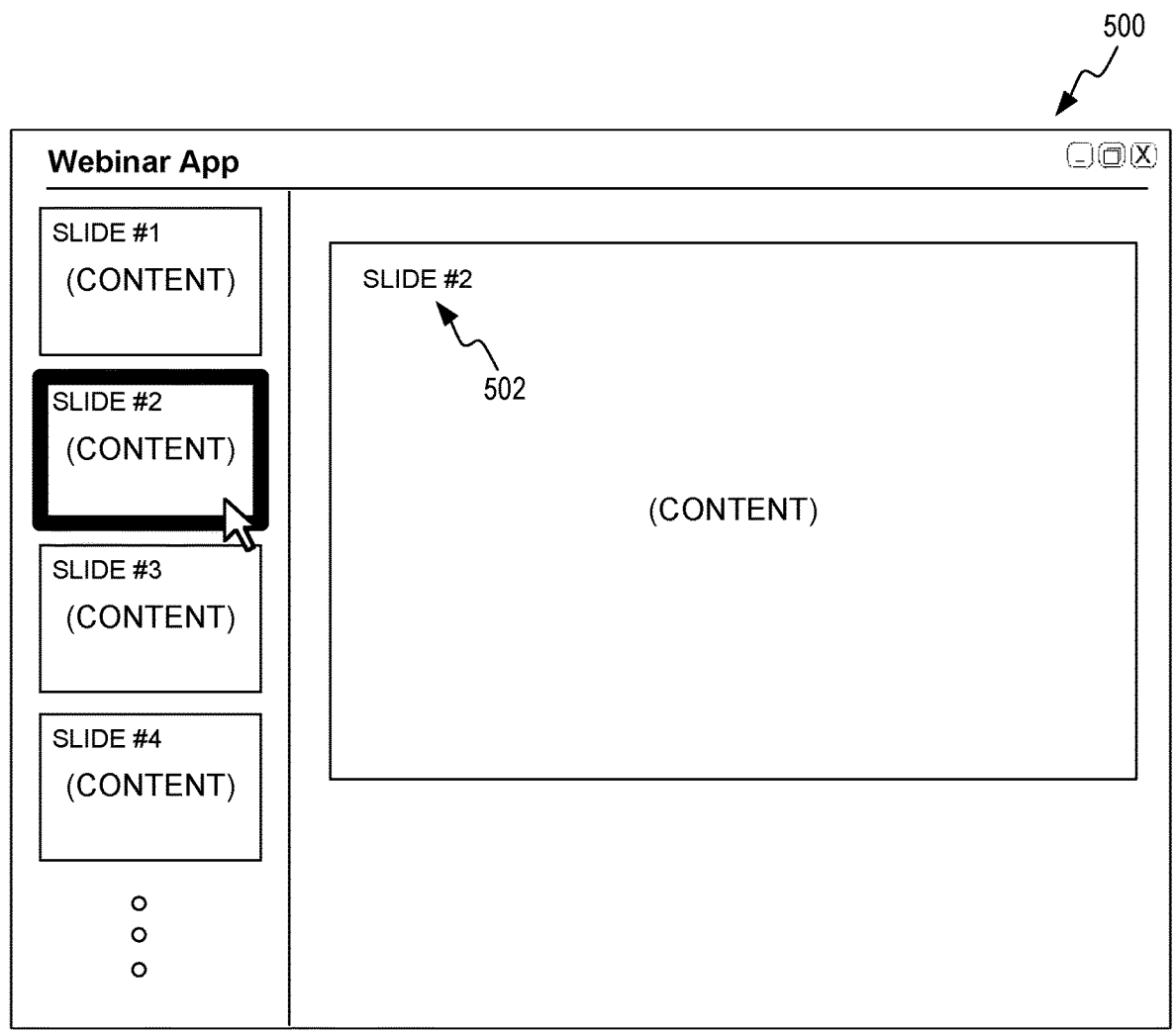
FIG. 5 illustrates an example user interface provided on a display of a client device in FIG. 1 for accessing slides in a webinar presentation video according to various embodiments of the present disclosure.

FIG. 5 illustrates an example user interface 500 provided on a display of a client device 122 in FIG. 1 for accessing slides in a webinar presentation video according to various embodiments of the present disclosure. Once the slide generator 110 partitions the webinar presentation video 118 into the slides, the UI generator 112 in the server computing device 102 causes a user interface 500 to be displayed at the client device 122. For some embodiments, the user interface displays, for each slide, thumbnail graphical representations of each slide and multimedia content contained in each slide. Furthermore, to facilitate access to each slide, the UI generator 112 may be further configured to superimpose text 502 on each slide thumbnail graphical representation to indicate the slide number. In the example user interface 500 shown, the UI generator 112 superimposes the text "Slide #" on each thumbnail graphical representation.

Figure 6:
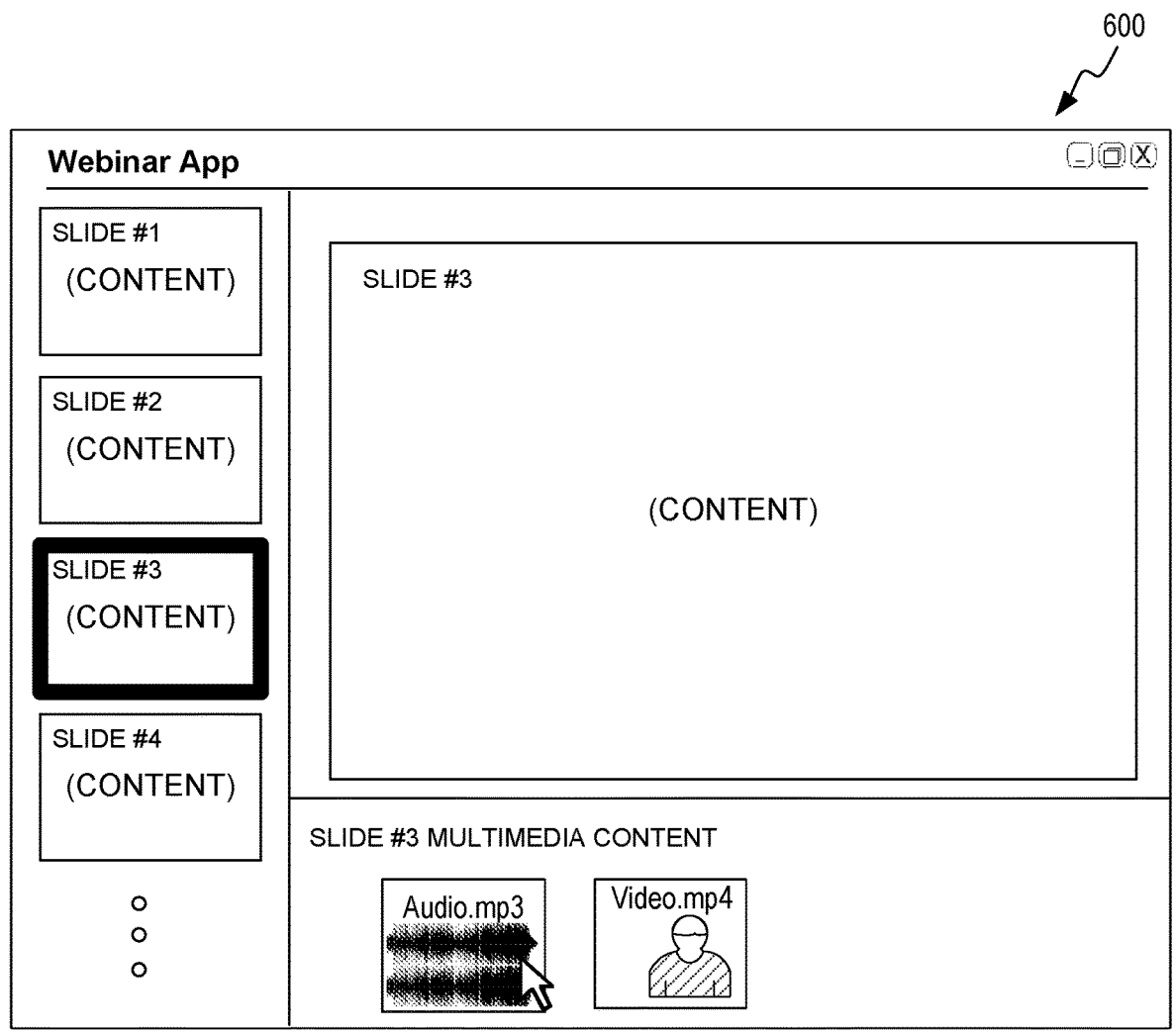
FIG. 6 illustrates an example user interface provided on a display of a client device in FIG. 1 for accessing multimedia content in a slide in a webinar presentation video according to various embodiments of the present disclosure.

FIG. 6 illustrates an example user interface 600 provided on a display of a client device 122 in FIG. 1 for accessing multimedia content in a slide in a webinar presentation video according to various embodiments of the present disclosure. For some embodiments, the user interface 600 includes thumbnail graphical representations for multimedia content contained in each slide. In the example shown, slide #3 includes both an audio file and a video file presented during live presentation of the webinar. The user at the client device 122 can utilize the user interface 600 to select one of the thumbnail graphical representations for playback. The webinar service 104 then performs playback of the selected multimedia content based on the time stamp data logged earlier by the tracker 106 during live presentation of the webinar.

Figure 7:
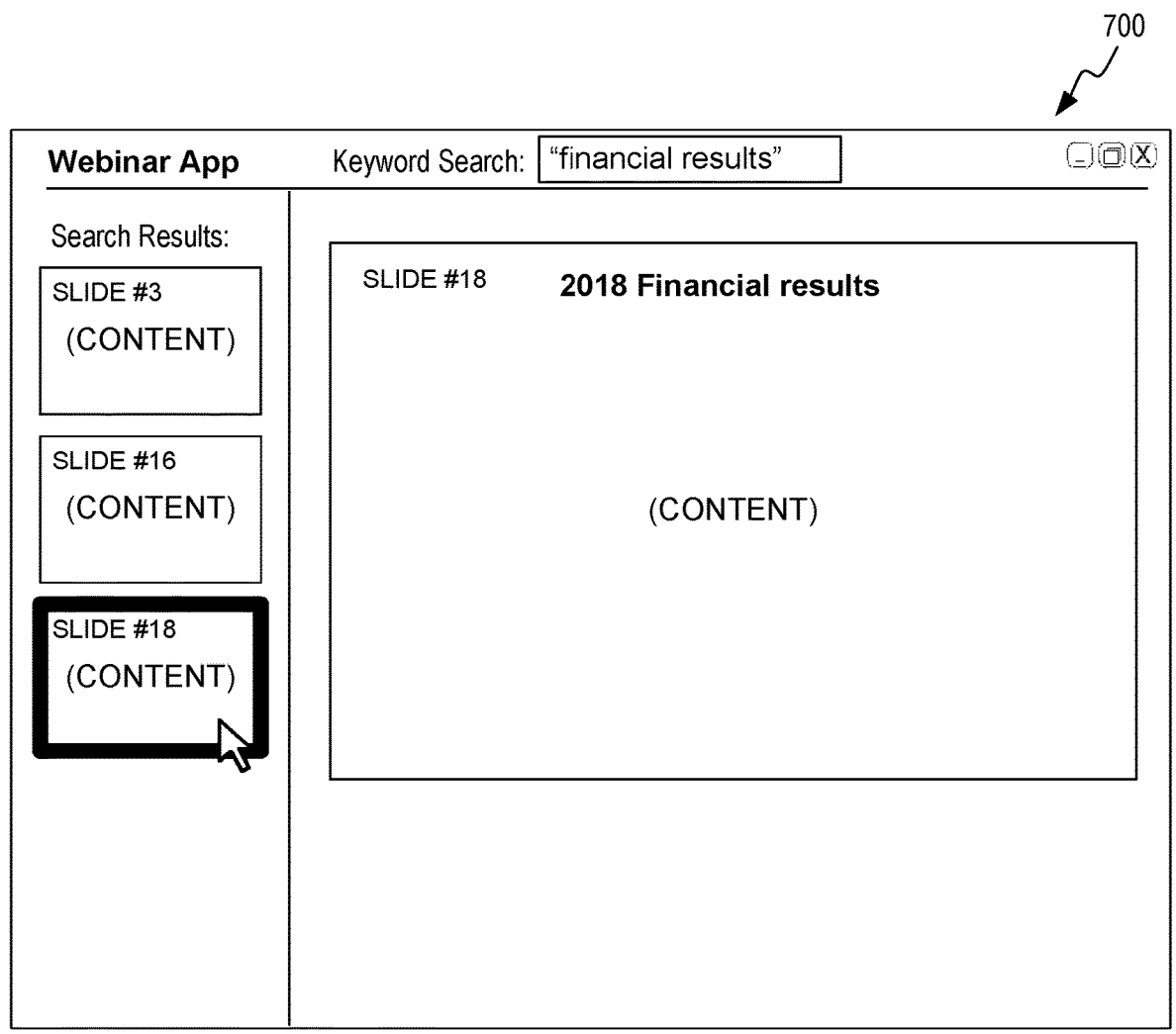
FIG. 7 illustrates an example user interface provided on a display of a client device in FIG. 1 for performing a keyword search for purposes of accessing slides in a webinar presentation video according to various embodiments of the present disclosure.

FIG. 7 illustrates an example user interface provided on a display of a client device 122 in FIG. 1 for performing a keyword search for purposes of accessing slides in a webinar presentation video according to various embodiments of the present disclosure. For some embodiments, the user can conduct a key word search of the slides in the webinar presentation video 118. The search engine 108 obtains a word or phrase and conducts a search based on metadata generated by the tracker 106 during live presentation of the webinar presentation. For some embodiments, the search engine 108 may be configured to perform a search and generate a grouping of candidate slides, as described earlier. In general, the grouping of candidate slides likely represents slides that contain more significant content that may be of interest to the viewer. In the example shown, various slides with the phrase "financial results" are found by the search engine 108 and presented on the user interface 700.

Figure 8:
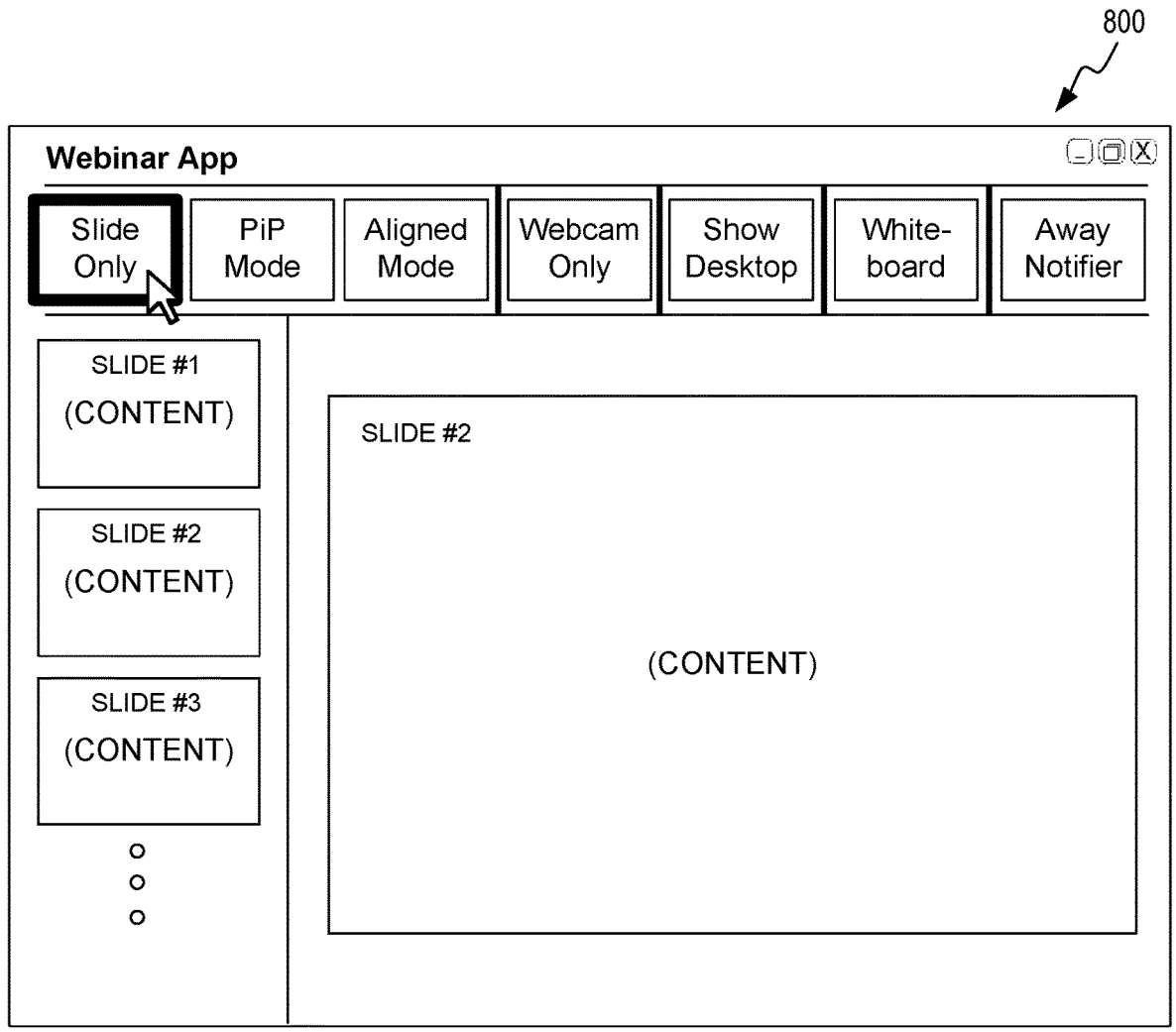
FIG. 8 illustrates an example user interface provided on a display of a client device in FIG. 1 during live presentation of a webinar according to various embodiments of the present disclosure.
Figure 8:
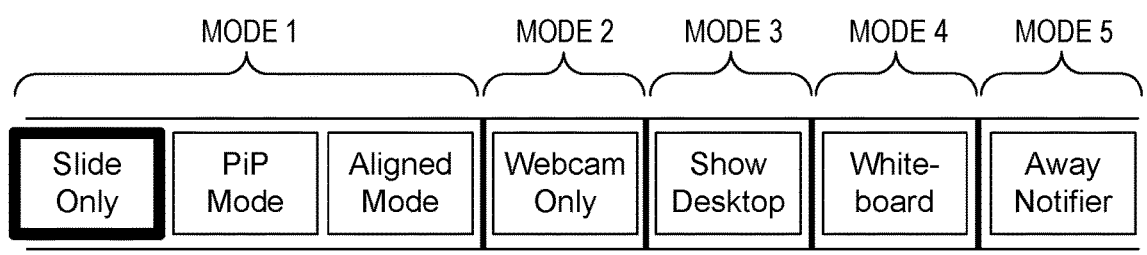

FIG. 8 illustrates an example user interface 800 provided on a display of a client device 122 in FIG. 1 during live presentation of a webinar according to various embodiments of the present disclosure. As discussed above, a user of a client device 122 (FIG. 1) attending a live webinar presentation may utilize various settings relating to viewing of the webinar presentation. Such settings may be associated with different modes of operations. As shown in FIG. 8, a first mode of operation may include a setting that allows the user to view slides of the webinar in a "slide only" mode, a setting that displays the webinar in a picture-in-picture (PIP) mode with respect to a webcam video of the presenter, or a setting that presents the webinar in an aligned mode where multiple slides are shown and aligned in a horizontal orientation or in a vertical orientation.

As further shown in the example user interface 800 of FIG. 8, a second mode of operation may include a setting that allows the user to only view live video of the webinar presenter captured by a webcam. A third mode of operation may include a setting that allows the user to minimize a window displaying the webinar such that the present desktop is shown. A fourth mode of operation may include a setting that allows the user to initiate a whiteboard application, whereby annotations are made by the presenter during the webinar. A fifth mode of operation may include a setting that allows the user to display a status of the user. For example, the user may wish to post a notification to the webinar presenter and to the other attendees that the user has momentarily stepped away and will shortly rejoin the webinar. As discussed above, the mode monitor 107 in the tracker 106 monitors for transitions between the various modes discussed above. Based on these mode transitions, various indices of the webinar are generated where each index corresponds to a portion of the webinar.

Figure 9:
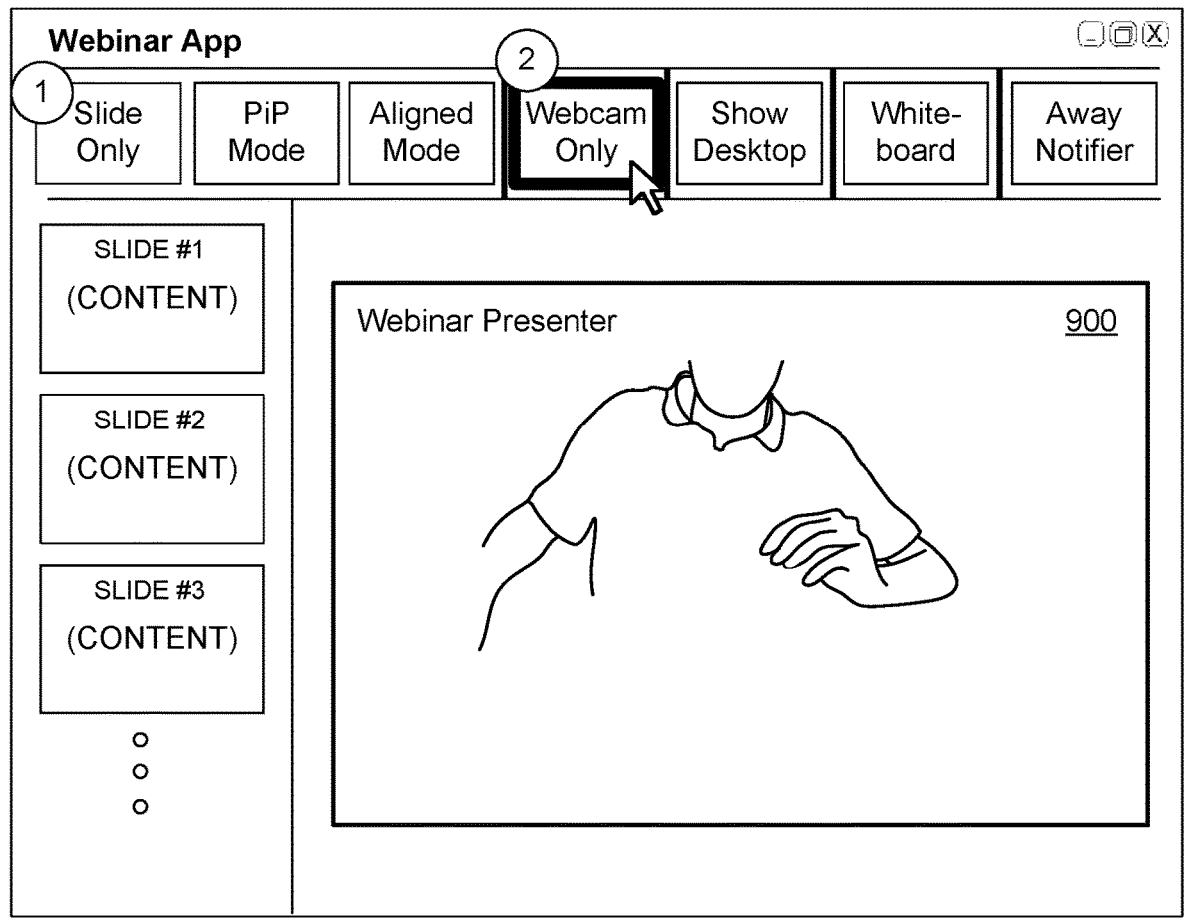
FIG. 9 illustrates transition between a first mode of operation to a second mode of operation by a user of a client device in FIG. 1 during live presentation of a webinar according to various embodiments of the present disclosure.

FIG. 9 illustrates transition between a first mode of operation to a second mode of operation by a user of a client device 122 in FIG. 1 during live presentation of a webinar according to various embodiments of the present disclosure. When the user transitions between the first mode of operation (i.e., slide only setting) to the second mode of operation (i.e., webcam only setting), the mode monitor 107 generates a trigger signal that causes the slide generator 110 to generate an index for that particular instance in the live webinar. The slide generator 110 also captures video of that particular instance in the live webinar for later access.

Figure 10:
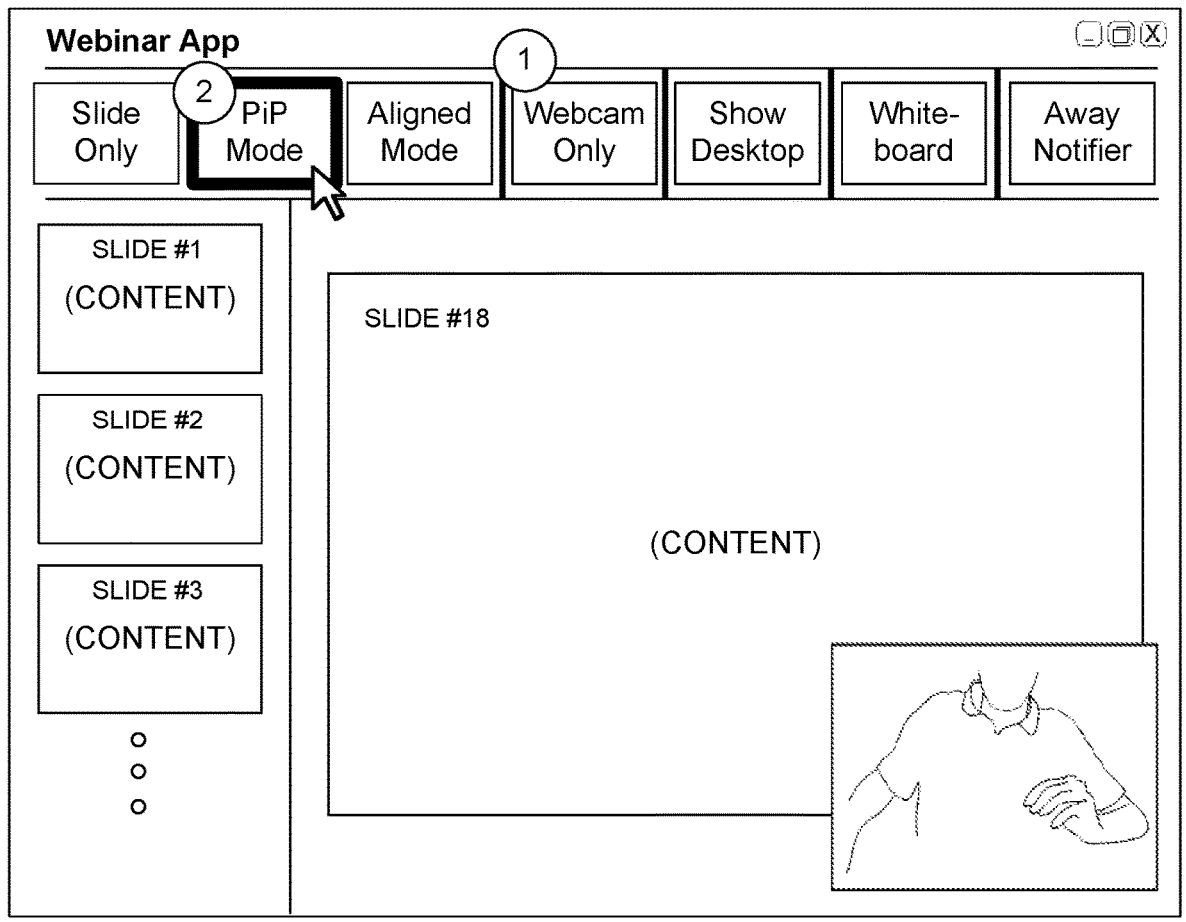
FIG. 10 illustrates transition between a second mode of operation to a first mode of operation by a user of a client device in FIG. 1 during live presentation of a webinar according to various embodiments of the present disclosure.

FIG. 10 illustrates transition between a second mode of operation to a first mode of operation by a user of a client device 122 in FIG. 1 during live presentation of a webinar according to various embodiments of the present disclosure. When the user transitions between the second mode of operation (i.e., webcam only setting) to the first mode of operation (i.e., PiP setting), the mode monitor 107 generates a trigger signal that causes the slide generator 110 to generate an index for that particular instance in the live webinar. The slide generator 110 also captures video of that particular instance in the live webinar for later access.

Figure 11:
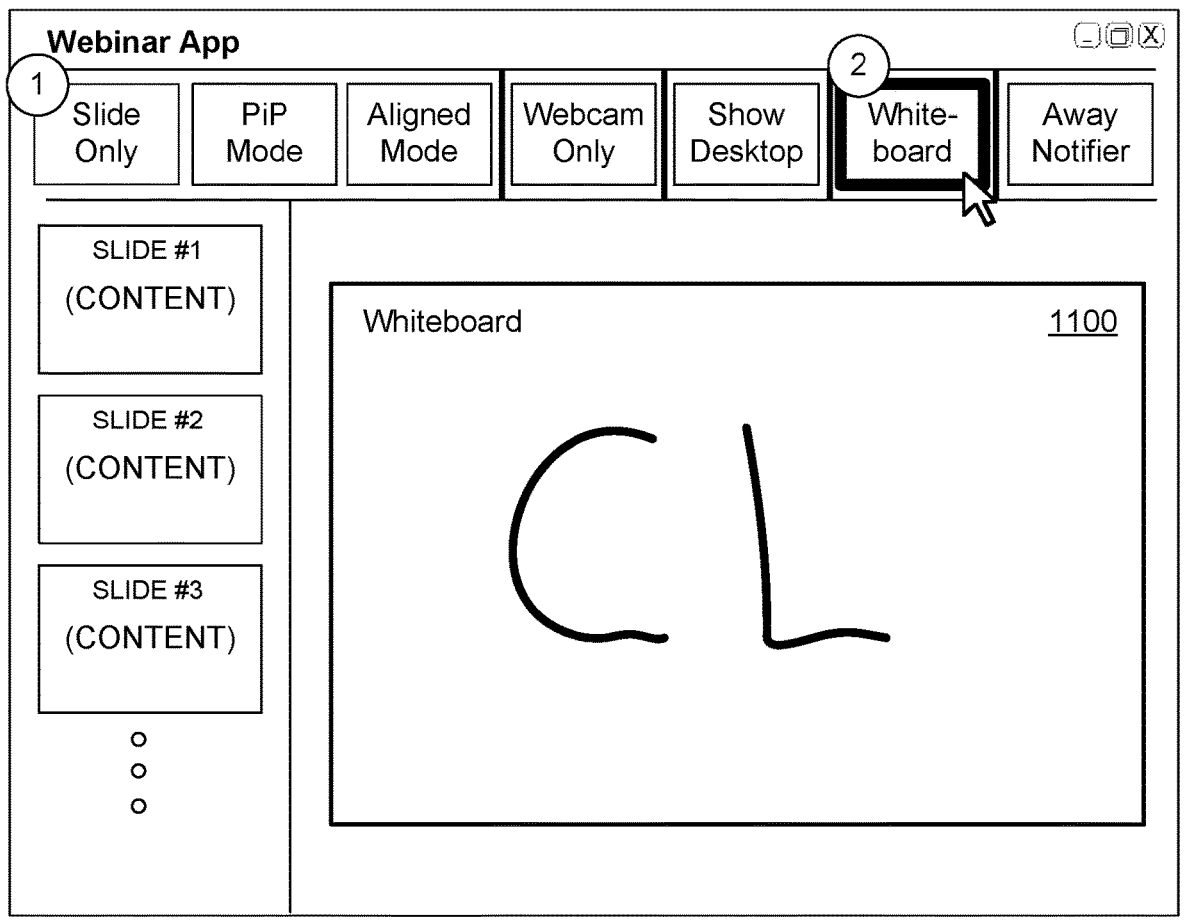
FIG. 11 illustrates transition between a first mode of operation to a fourth mode of operation by a user of a client device in FIG. 1 during live presentation of a webinar according to various embodiments of the present disclosure.

FIG. 11 illustrates transition between a first mode of operation to a fourth mode of operation by a user of a client device in FIG. 1 during live presentation of a webinar according to various embodiments of the present disclosure. When the user transitions between the first mode of operation (i.e., slide only setting) to the fourth mode of operation (i.e., whiteboard setting), the mode monitor 107 generates a trigger signal that causes the slide generator 110 to generate an index for that particular instance in the live webinar. The slide generator 110 also captures video of that particular instance in the live webinar for later access.

Figure 12:
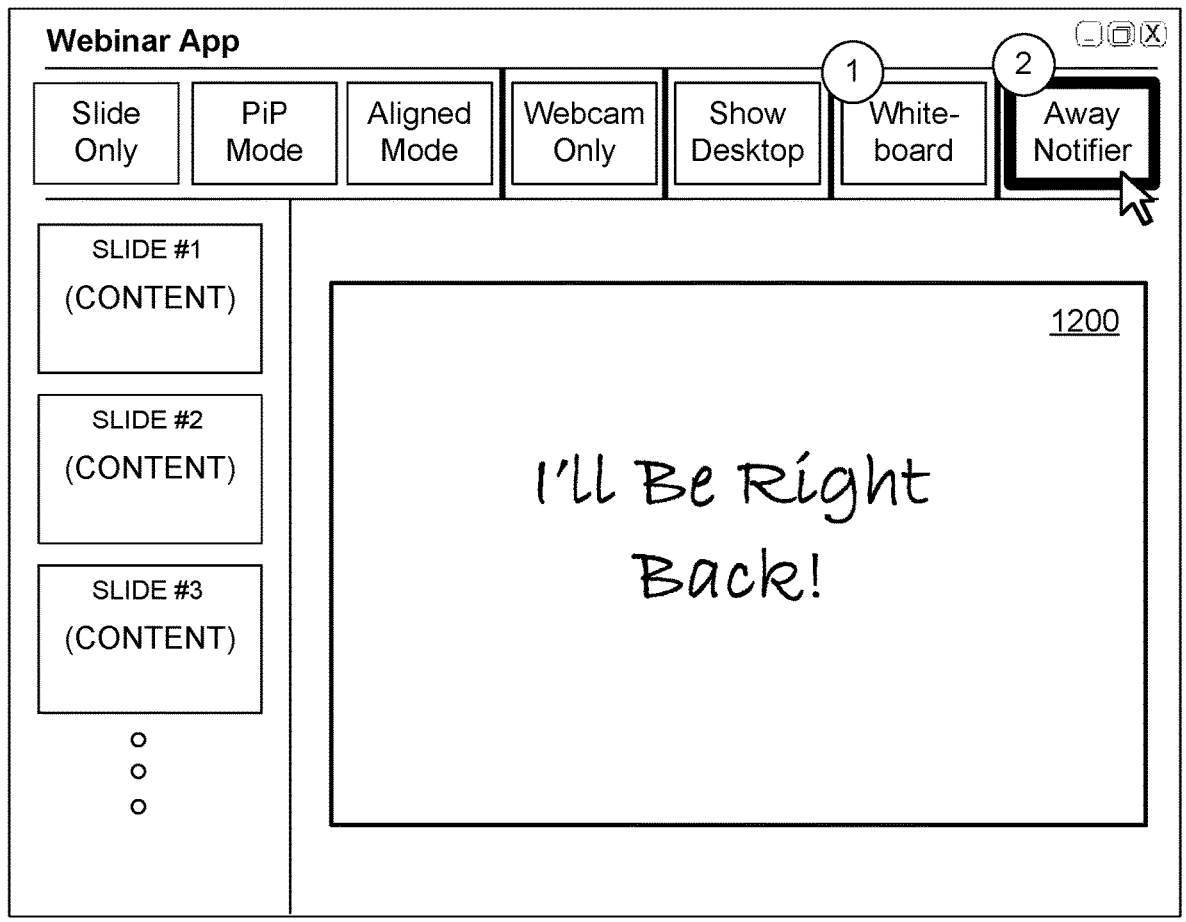
FIG. 12 illustrates transition between a fourth mode of operation to a fifth mode of operation by a user of a client device in FIG. 1 during live presentation of a webinar according to various embodiments of the present disclosure.

FIG. 12 illustrates transition between a fourth mode of operation to a fifth mode of operation by a user of a client device in FIG. 1 during live presentation of a webinar according to various embodiments of the present disclosure. When the user transitions between the fourth mode of operation (i.e., whiteboard setting) to the fifth mode of operation (i.e., away notifier setting), the mode monitor 107 generates a trigger signal that causes the slide generator 110 to generate an index for that particular instance in the live webinar. The slide generator 110 also captures video of that particular instance in the live webinar for later access. For some embodiments, the host can select one or more slides to remain hidden before the host begins presenting the live webinar such that the hidden slides are not part of the live webinar. In this regard, when the user performs playback of the archived webinar, none of the hidden slides are part of the archived webinar. Note that although certain slides may be selected to be hidden prior to the live webinar, the host can later elect to cause the previously-hidden slides to be part of the live webinar.

Figure 13:
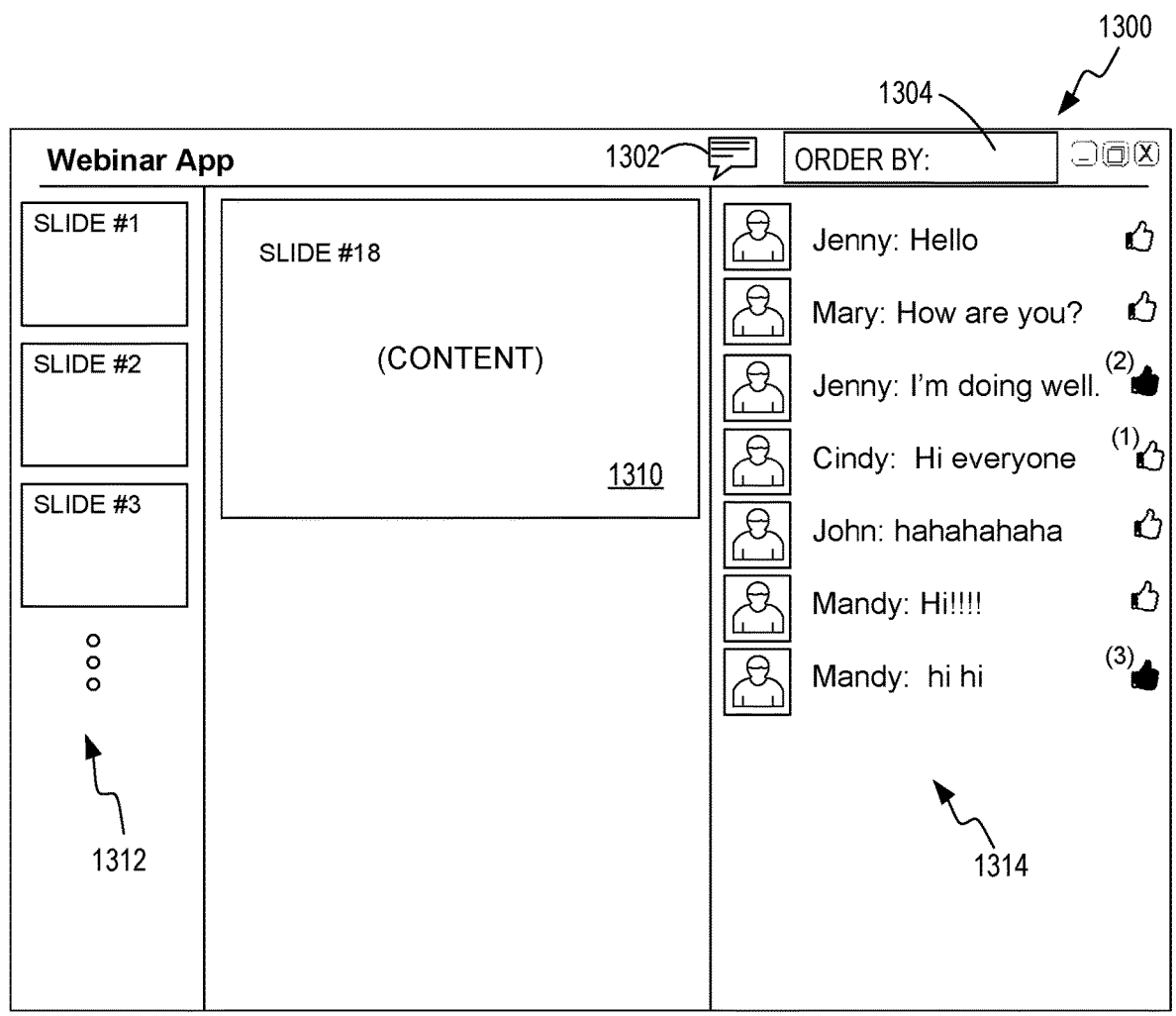
FIG. 13 illustrates an example user interface provided on a display of a client device in FIG. 1 for sorting content of a chat room session according to various embodiments.

Reference is now made to FIGS. 13-18, which illustrate the content of a chat room session ordered according to sorting criteria selected by the user according to various embodiments. FIG. 13 illustrates an example user interface 1300 provided on a display of a client device 122 in FIG. 1 for sorting content of a chat room session according to various embodiments. The user interface 1300 includes a slide section 1312, a presentation section 1310, and a chat session section 1314. The user interface 1300 includes a user interface control 1302 for displaying or hiding a current chat session. The user interface 1300 also includes a user interface control 1304 for specifying sorting criteria for rearranging content of the chat session. By default, the content of the chat session is sorted according to time starting with the entry with the earliest time stamp at the top.

Figure 14:
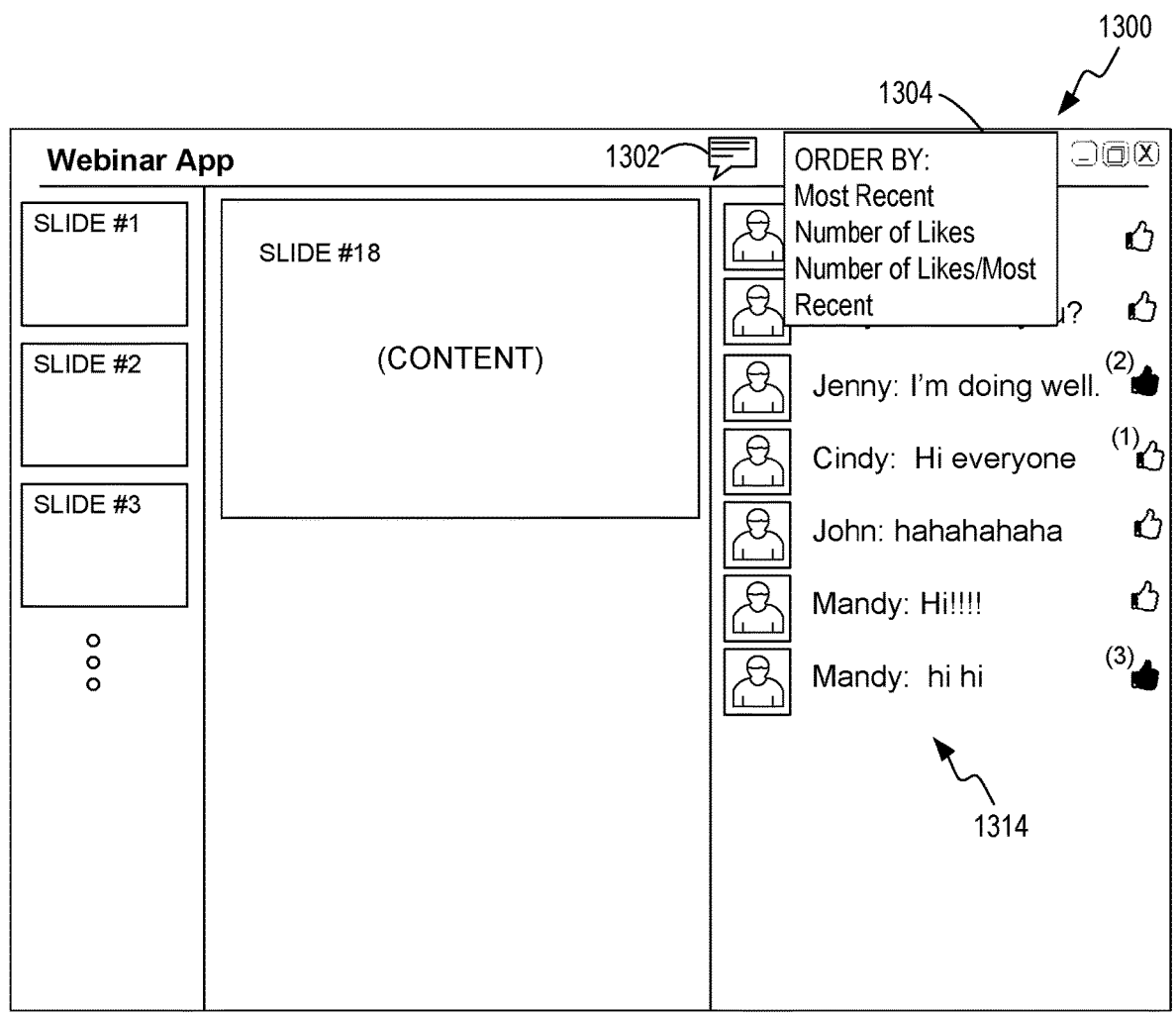
FIG. 14 illustrates selectable sorting criteria in the example user interface of FIG. 13 according to various embodiments.
Figure 15:
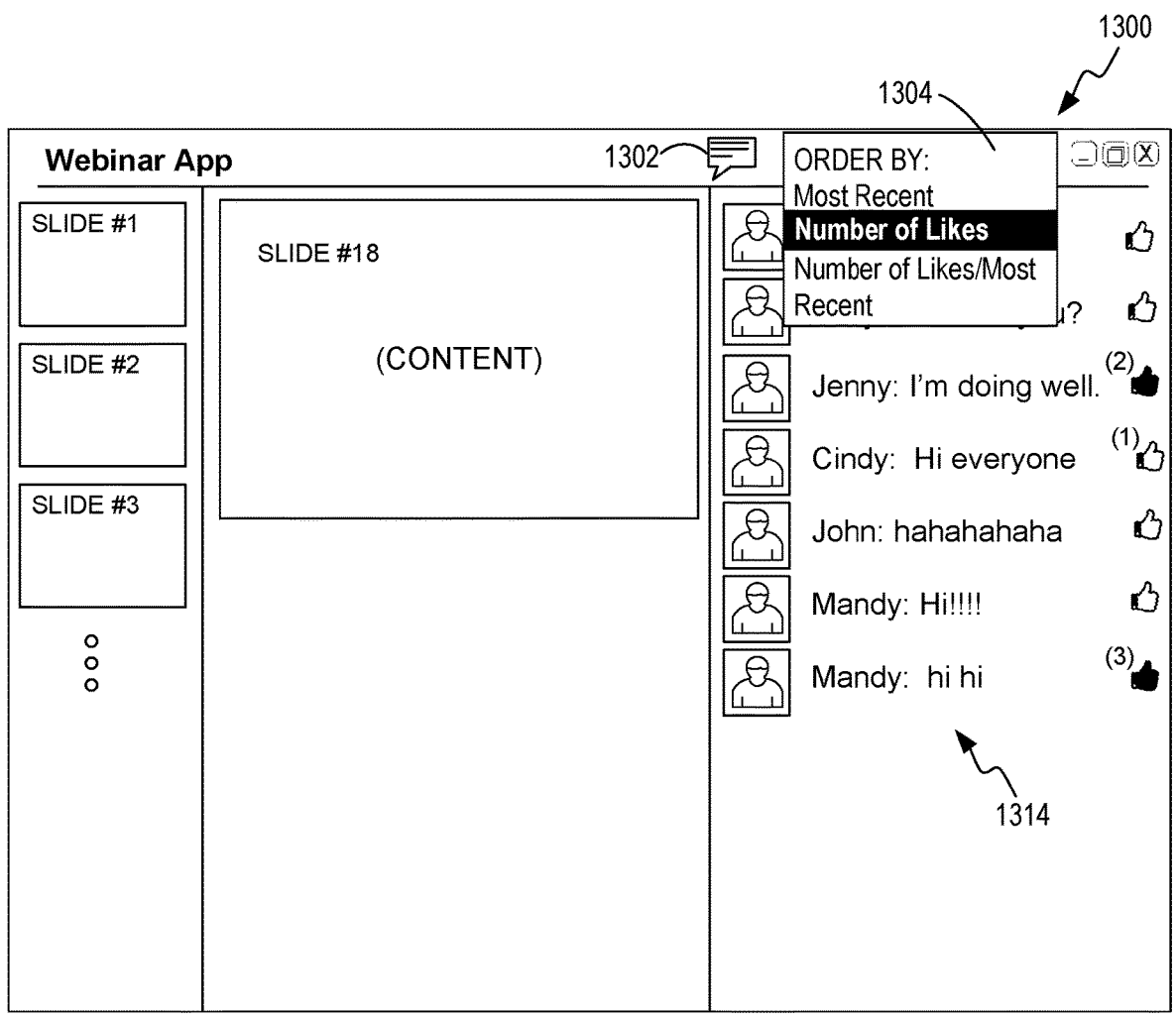
FIG. 15 illustrates selection of sorting criteria by the user in the example user interface of FIG. 13 according to various embodiments.

FIG. 14 illustrates selectable sorting criteria in the example user interface 1300 of FIG. 13 according to various embodiments, where selection is made via the user interface control 1304. FIG. 15 illustrates selection of sorting criteria by the user in the example user interface 1300 of FIG. 13 according to various embodiments. In the example shown, the user elects to sort the content of the chat session according to the number of likes associated with each entry.

Figure 16:
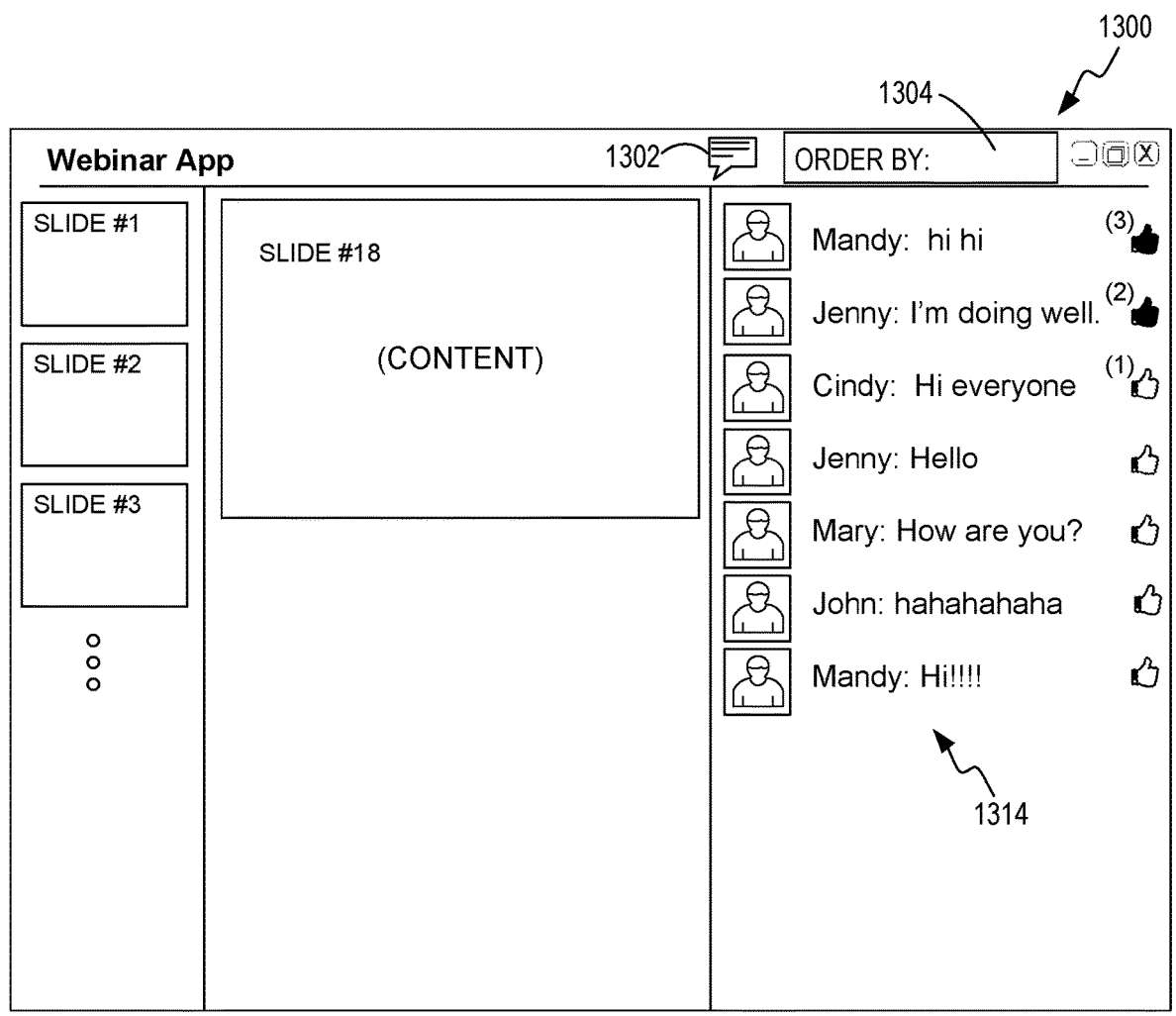
FIG. 16 illustrates application of the selected sorting criteria in the example user interface of FIG. 13 according to various embodiments.
Figure 17:
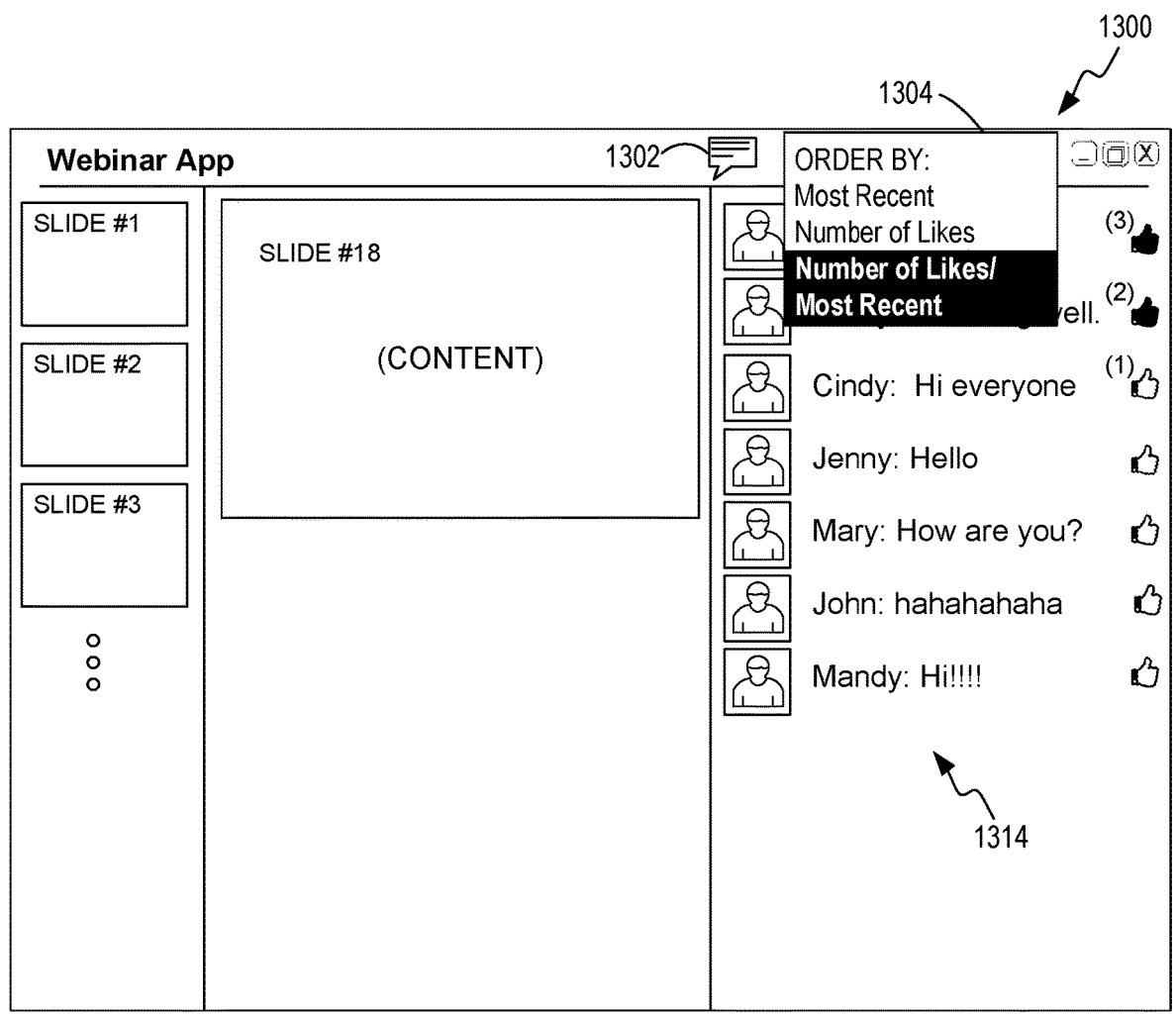
FIG. 17 illustrates selection of other sorting criteria by the user in the example user interface of FIG. 13 according to various embodiments.
Figure 18:
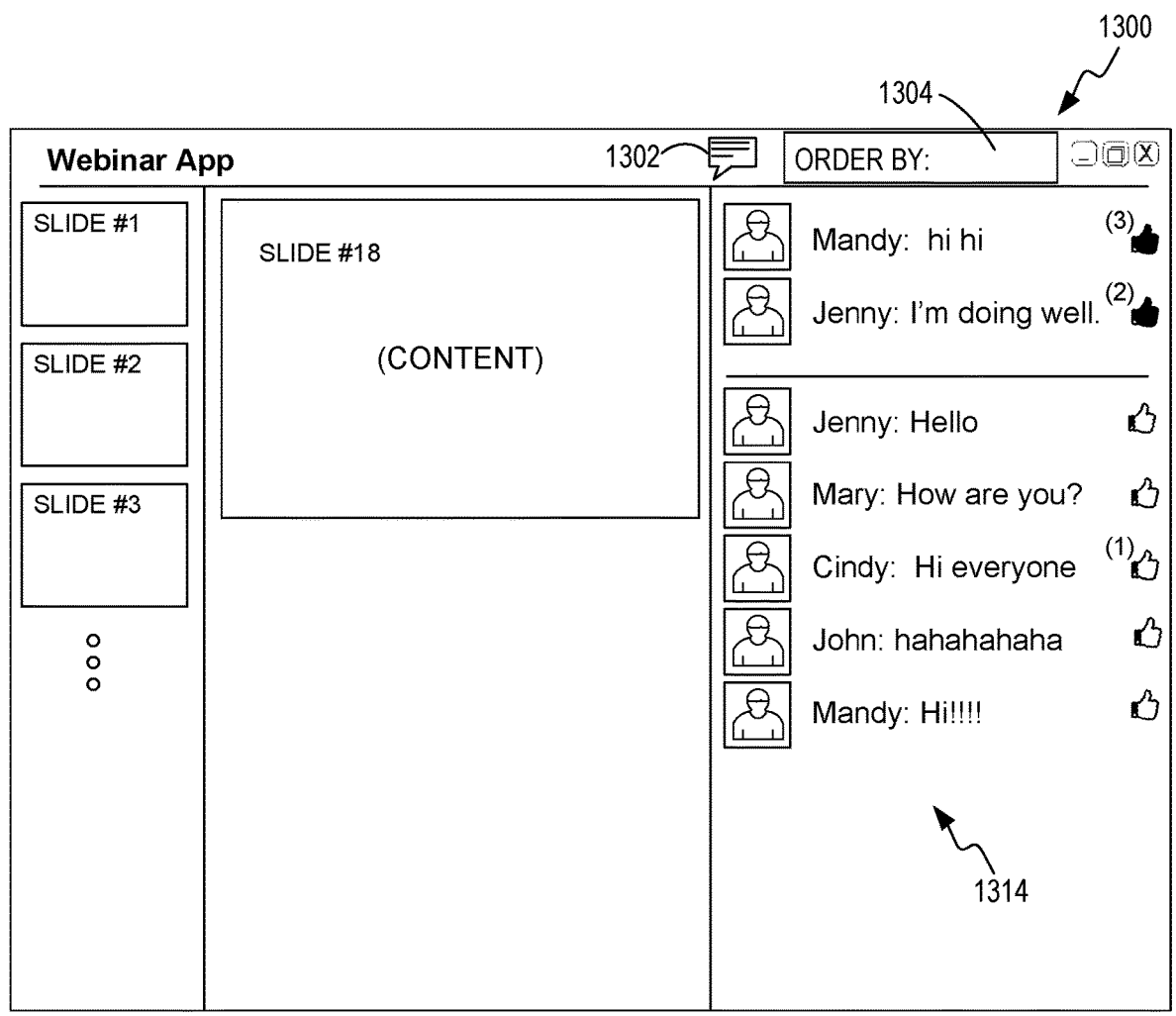
FIG. 18 illustrates application of the other selected sorting criteria in the example user interface of FIG. 13 according to various embodiments.

FIG. 16 illustrates application of the selected sorting criteria in the example user interface of FIG. 13 according to various embodiments. As shown, the entries of the chat session are rearranged and sorted starting with the entry with the most number of likes at the top. FIG. 17 illustrates selection of other sorting criteria by the user in the example user interface 1300 of FIG. 13 according to various embodiments. In the example shown, the user elects to sort the content of the chat session according to both the number of likes and according to the most recent entries. FIG. 18 illustrates application of the new selected sorting criteria in the example user interface 1300 of FIG. 13 according to various embodiments. As shown, the chat session section 1314 is partitioned into two sections. The first section sorts entries of the chat session according to number of likes starting with the entry with the most number of likes at the top. The second section sorts entries of the chat session starting with the entry with the earliest time stamp at the top.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

At least the following is claimed:

1. A method implemented in a server computing device, comprising:
   receiving user input from a presenter to initiate a live webinar presentation comprising a plurality of slides;
   responsive to receiving the user input to initiate the live webinar presentation, performing the steps of:
      determining a plurality of slide transitions from the live webinar presentation and logging time stamp data for each slide transition; and
      storing the live webinar presentation as a webinar presentation video and the time stamp data in the server computing device;
   obtaining a request from a client device to view the stored webinar presentation video;
   partitioning the webinar presentation video into slides based on the time stamp data;
   causing a user interface to be displayed at the client device, the user interface displaying, for each slide, thumbnail graphical representations of each slide for playback of the stored webinar presentation video based on a thumbnail graphical representation selected by the user, wherein playback of the stored webinar presentation video begins at a slide corresponding to the selected thumbnail graphical representation;
   obtaining at least one keyword from the client device;
   generating and displaying a grouping comprising at least one candidate slide in the webinar presentation based on the at least one keyword and the time stamp data; and
   obtaining a selection of a slide in the grouping comprising at least one candidate slide and performing playback of a portion of the webinar presentation video corresponding to the selected slide.

2. The method of claim 1, wherein at least one of: a slide title, slide numbering, annotation, and animation is stored with the webinar presentation video.

3. The method of claim 1, wherein playback of the stored webinar presentation video is further based on generating attendee participation data selected by the user.

4. The method of claim 3, wherein generating the attendee participation data comprises at least one of:
   tracking a number of attendees viewing each slide in the webinar presentation;
   tracking chat content generated by attendees for each slide in the webinar presentation; and
   tracking a list of attendees.

5. The method of claim 4, wherein tracking the chat content generated by the attendees for each slide in the webinar presentation comprises:
   identifying words with a threshold occurrence rate in the chat content; and
   storing the identified words.

6. The method of claim 1, wherein generating the grouping comprising at least one candidate slide in the webinar presentation based on the time stamp data comprises analyzing the time stamp data for each slide and including slides viewed for at least a threshold time interval in the grouping comprising the at least one candidate slide.

7. The method of claim 1, wherein responsive to receiving the user input to initiate the webinar presentation, further performing the step of:
  obtaining user input indicating viewer approval of slides and tracking slides corresponding to the user input as viewer approved slides.

8. The method of claim 7, wherein generating the grouping comprising at least one candidate slide in the webinar presentation is performed further based on viewer approved slides have a threshold level of viewer approval.

9. The method of claim 1, wherein the user input comprises a voice command directing the server computing device to locate a slide in the live webinar presentation.

10. The method of claim 1, further comprising:
  obtaining a voice command from the client device;
  performing speech-to-text conversion on the voice command to obtain at least one keyword;
  generating a grouping comprising at least one candidate slide in the webinar presentation based on the at least one keyword and the time stamp data; and
  obtaining a selection of a slide in the grouping comprising at least one candidate slide and performing playback of a portion of the webinar presentation video corresponding to the selected slide.

11. A system, comprising:
  a memory storing instructions;
  a processor coupled to the memory and configured by the instructions to at least:
    receive user input from a presenter to initiate a live webinar presentation comprising a plurality of slides;
    responsive to receiving the user input to initiate the live webinar presentation, perform the steps of:
      determine a plurality of slide transitions from the live webinar presentation and logging time stamp data for each slide transition; and
      storing the live webinar presentation as a webinar presentation video and the time stamp data in the server computing device;
    obtain a request from a client device to view the stored webinar presentation video;
    partition the webinar presentation video into slides based on the time stamp data;
    cause a user interface to be displayed at the client device, the user interface displaying, for each slide, thumbnail graphical representations of each slide for playback of the stored webinar presentation video based on a thumbnail graphical representation selected by the user, wherein playback of the stored webinar presentation video begins at a slide corresponding to the selected thumbnail graphical representation;
    obtain at least one keyword from the client device;
    generate and displaying a grouping comprising at least one candidate slide in the webinar presentation based on the at least one keyword and the time stamp data; and
    obtain a selection of a slide in the grouping comprising at least one candidate slide and performing playback of a portion of the webinar presentation video corresponding to the selected slide.

12. The system of claim 11, wherein the processor generates attendee participation data by tracking a number of attendees viewing each slide in the webinar presentation; tracking chat content generated by attendees for each slide in the webinar presentation; and tracking a list of attendees.

13. The system of claim 12, wherein the processor tracks the chat content generated by the attendees for each slide in the webinar presentation by identifying words with a threshold occurrence rate in the chat content and storing the identified words.

14. The system of claim 11, wherein the processor generates the grouping comprising at least one candidate slide in the webinar presentation based on the time stamp data by analyzing the time stamp data for each slide and including slides viewed for at least a threshold time interval in the grouping comprising the at least one candidate slide.

15. The system of claim 11, wherein responsive to receiving the user input to initiate the webinar presentation, the processor if further configured to obtain user input indicating viewer approval of slides and tracking slides corresponding to the user input as viewer approved slides.

16. The system of claim 11, wherein the processor generates the grouping comprising at least one candidate slide in the webinar presentation further based on viewer approved slides have a threshold level of viewer approval.

17. A non-transitory computer-readable storage medium storing instructions to be implemented by a computing device having a processor, wherein the instructions, when executed by the processor, cause the computing device to at least:
  receive user input from a presenter to initiate a live webinar presentation comprising a plurality of slides;
  responsive to receiving the user input to initiate the live webinar presentation, perform the steps of:
    determine a plurality of slide transitions from the live webinar presentation and logging time stamp data for each slide transition; and
    storing the live webinar presentation as a webinar presentation video and the time stamp data in the server computing device;
  obtain a request from a client device to view the stored webinar presentation video;
  partition the webinar presentation video into slides based on the time stamp data;
  cause a user interface to be displayed at the client device, the user interface displaying, for each slide, thumbnail graphical representations of each slide for playback of the stored webinar presentation video based on a thumbnail graphical representation selected by the user, wherein playback of the stored webinar presentation video begins at a slide corresponding to the selected thumbnail graphical representation;
  obtain at least one keyword from the client device;
  generate and displaying a grouping comprising at least one candidate slide in the webinar presentation based on the at least one keyword and the time stamp data; and
  obtain a selection of a slide in the grouping comprising at least one candidate slide and performing playback of a portion of the webinar presentation video corresponding to the selected slide.

* * * * *